(12) United States Patent
Chen et al.

(10) Patent No.: US 10,849,352 B2
(45) Date of Patent: Dec. 1, 2020

(54) COFFEE BEAN ROASTING-DEGREE DISTRIBUTION MEASURING DEVICE AND METHOD

(71) Applicant: LIGHTTELLS CORP., LTD., Zhubei (TW)

(72) Inventors: Chia-Chung Chen, Zhubei (TW); Meng-Fang Yu, Zhubei (TW)

(73) Assignee: Lighttells Corp., Ltd., Zhubei (TW)

( * ) Notice: Subject to any disclaimer, the term of this patent is extended or adjusted under 35 U.S.C. 154(b) by 0 days.

(21) Appl. No.: 16/383,154

(22) Filed: Apr. 12, 2019

(65) Prior Publication Data

US 2020/0245671 A1 Aug. 6, 2020

(30) Foreign Application Priority Data

Jan. 31, 2019 (TW) .............................. 108103705 A

(51) Int. Cl.
| | |
|---|---|
| *A23N 12/00* | (2006.01) |
| *A23N 12/08* | (2006.01) |
| *A23N 12/12* | (2006.01) |
| *H04N 5/225* | (2006.01) |
| *G06T 7/90* | (2017.01) |
| *G06T 7/00* | (2017.01) |
| *G06F 3/14* | (2006.01) |

(52) U.S. Cl.
CPC ............. *A23N 12/125* (2013.01); *G06F 3/14* (2013.01); *G06T 7/0002* (2013.01); *G06T 7/90* (2017.01); *H04N 5/2256* (2013.01)

(58) Field of Classification Search
CPC ...... A23N 12/10; A23N 12/125; A23N 12/00; G01N 15/1475; A47J 31/4492; C12P 7/06; G06T 7/90; G06T 7/0002; G06F 3/14; H04N 5/2256

USPC ............................................ 348/89; 382/110
See application file for complete search history.

(56) References Cited

U.S. PATENT DOCUMENTS 9,842,252 B2 * 12/2017 Edgerton .................. C12P 7/06
10,213,047 B2 * 2/2019 Boggavarapu ...... A47J 31/4492
(Continued)

FOREIGN PATENT DOCUMENTS

KR 101455056 B1 * 10/2014 .............. G01J 3/463

*Primary Examiner* — Albert Kir
(74) *Attorney, Agent, or Firm* — Muncy, Geissler, Olds & Lowe, P.C.

(57) ABSTRACT

A coffee bean roasting-degree distribution measuring device includes a housing, a micro-processing unit, an image-capturing unit, a light-emitting unit, and a displaying unit. The housing has a first end and a second end opposite the first end with an accommodating space existing between the first end and the second end. The second end is disposed to surround a group of coffee beans under measurement. The micro-processing unit and the image-capturing unit are disposed inside the accommodating space and electrically connected to each other. The light-emitting unit is disposed inside the accommodating space and includes at least one light emitter and a circuit board electrically connected to the light emitter. The circuit board is further electrically connected to the micro-processing unit and each of the light emitter has a light emitting port facing toward the second end. The display unit is disposed on the first end and electrically connected to the micro-processing unit to display a measured roasting-degree distribution curve.

6 Claims, 5 Drawing Sheets

(56) References Cited

U.S. PATENT DOCUMENTS

| | | | |
|---|---|---|---|
| 10,412,988 B2* | 9/2019 | Jacobsen | A23N 12/10 |
| 2005/0074146 A1* | 4/2005 | Jones | G01N 15/1475 |
| | | | 382/110 |

* cited by examiner

COFFEE BEAN ROASTING-DEGREE DISTRIBUTION MEASURING DEVICE AND METHOD

TECHNICAL FIELD

The present invention relates to a measuring device and particularly to a coffee bean roasting-degree distribution measuring device and method.

BACKGROUND

Many people have the habit of drinking coffee, and the flavor of coffee itself is believed to be related to the coffee bean roasting-degree variation. In order to taste coffee beans with different roasting-degrees, it is necessary to distinguish the roasting-degree difference between the coffee beans used to make the coffee, therefore, how to measure the coffee bean roasting-degree became a technical issue in the relevant technical field.

However, the currently used machines and devices for measuring the roasting-degree of the coffee beans can only measure a single roasting-degree of a group of coffee beans. In this way, the measured single roasting-degree is not enough to differentiate the roasting-degree difference in the group of coffee beans. Also, another one of the concerned issues is how to represent the roasting-degree difference and allow the discriminator to directly receive the information of the measurement.

SUMMARY

In view of the above issues, this application proposes a coffee bean roasting-degree measuring device, which can measure the roasting-degree distribution of the coffee beans under measurement. The device not only makes the coffee bean's roasting degree determination more precise, but also allows the discriminator to directly receive the information of roasting-degree distribution.

In one embodiment, the coffee bean roasting-degree distribution measuring device contains a housing, a micro-processing unit, an image-capturing unit, a memory-unit, a light-emitting unit and a displaying unit. The housing contains a first end, a second end opposite the first end, and an accommodating space disposed between the first end and second end. The second end has an opening to surround a group of coffee beans under measurement when the measuring device is in operation. The micro-processing unit and the image-capturing unit are disposed inside the accommodating space and electrically connected with each other. The memory-unit is disposed inside the accommodating space and electronically connected to the micro-processing unit and the image-capturing unit. The light-emitting unit is disposed inside the accommodating space and contains at least one light emitter and a circuit board electrically connected to the light emitter, the circuit board is electrically connected to the micro-processing unit, and the light emitter has a light emitting port facing toward the second end. The displaying unit has a screen and is disposed on the first end and is electrically connected to the micro-processing unit. The light emitter of the light emitting unit projects light onto the group of coffee beans under measurement when the micro-processing unit sends a first instruct signal to the light emitting unit; the image-capturing unit captures an image of a light-projected surface of the coffee beans under measurement and the memory unit stores an optical signal value of each pixel of the captured image when the micro-processing unit sends a second instruct signal to the image-capturing unit; the optical signal value of each pixel of the captured image is converted by the micro-processing unit into a roasting-degree when the micro-processing unit sends a third instruct signal to the memory unit; and the displaying unit presents a roasting-degree distribution curve reflecting all of the roasting-degrees on the screen when the micro-processing unit sends a fourth instruct signal to the displaying unit.

In one embodiment, the coffee bean roasting-degree distribution measuring device presents a two-dimensional roasting-degree distribution curve defined in an axis by the roasting-degrees and in another axis by a coffee bean amount ratio corresponding to the roasting-degrees.

In one embodiment, the coffee bean roasting-degree distribution measuring device presents a three-dimensional roasting-degree distribution curve reflecting the roasting-degrees corresponding to each pixel position of the group of coffee beans.

In one embodiment, the displaying unit further presents one of a standard deviation and a coefficient of variation of the roasting-degrees of the group of coffee beans.

In one embodiment, the coffee bean roasting-degree distribution measuring device further has a measure start button disposed on the housing and electrically connected to the micro-processing unit, wherein only a press of the measure start button triggers the micro-processing to send one of the first instruct signal, the second instruct signal, the third signal, and the fourth signal.

In one embodiment, the coffee bean roasting-degree distribution measuring device further has a power supply unit disposed inside the accommodating unit and electrically connected to the micro-processing unit to provide the micro-processing unit with an electrical power.

In one embodiment, the micro-processing unit has a pixel luminance resolving unit and a roasting-degree converting unit electrically connected to the pixel luminance resolving unit, the pixel luminance resolving unit converts the optical signal value of each pixel of the captured image of the light-projected surface into an electrical signal value, and the roasting-degree converting unit converts the converted electrical signal value into one of the roasting-degrees.

This application also proposes a coffee bean roasting-degree distribution measuring method in another aspect. The proposed method contains the following steps: projecting light onto a group of coffee beans under measurement; capturing an image of a light-projected surface of the group of coffee beans under measurement and storing an optical signal value of each pixel of the captured image; converting the optical signal value of each pixel of the captured image into a corresponding roasting-degree; and presenting a roasting-degree distribution curve reflecting all of the roasting-degrees on a screen.

In one embodiment, the roasting-degree distribution curve is defined in an axis by the roasting-degrees and in another axis by a coffee bean amount ratio corresponding to the roasting-degrees.

In one embodiment, the roasting-degree distribution curve reflects the roasting-degrees corresponding to each pixel position of the group of coffee beans.

In conclusion, based on the coffee bean roasting-degree distribution measuring device and method, not only a single roasting-degree of a group of coffee beans or grounded coffee powders can be measured, but also the roasting-degree variance or the roasting-degree distribution between each coffee bean in the group of coffee beans or between each particle in the grounded coffee powders can be measured, furthermore, the roasting uniformity can be obtained based on a dispersion, a standard deviation or a coefficient of variation of the roasting-degrees of the coffee beans or the grounded coffee powders, which allows a more precise roasting-degree variance determination.

BRIEF DESCRIPTION OF DRAWINGS

The following detailed descriptions, given by way of example, and not intended to limit the present invention solely thereto, will be best be understood in conjunction with the accompanying figures.

DETAILED DESCRIPTION OF THE EMBODIMENTS

Figure 1:
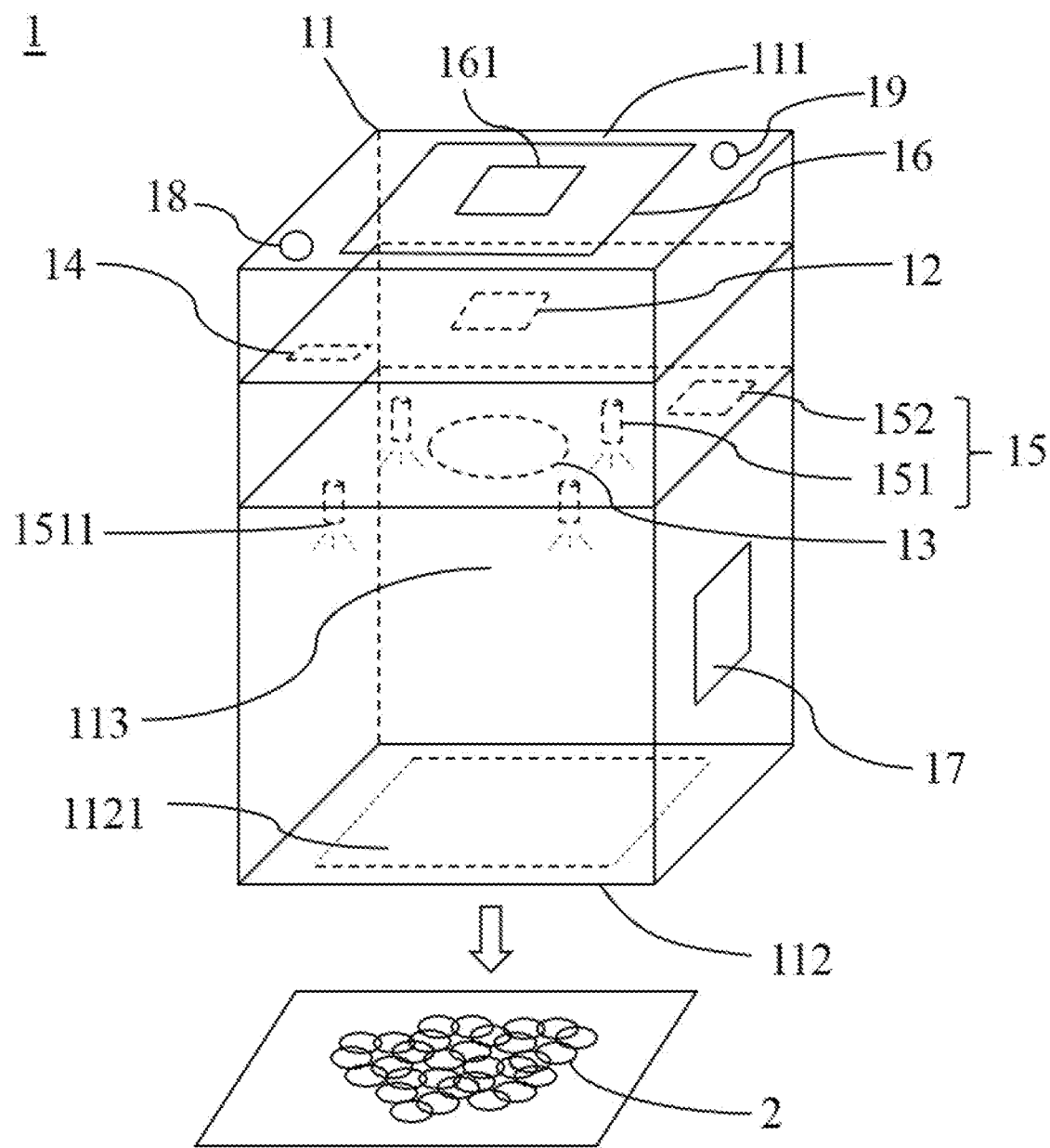
FIG. 1 is a three-dimensional perspective view schematically showing a coffee bean roasting-degree distribution measuring device according to an embodiment of this invention.
Figure 2:
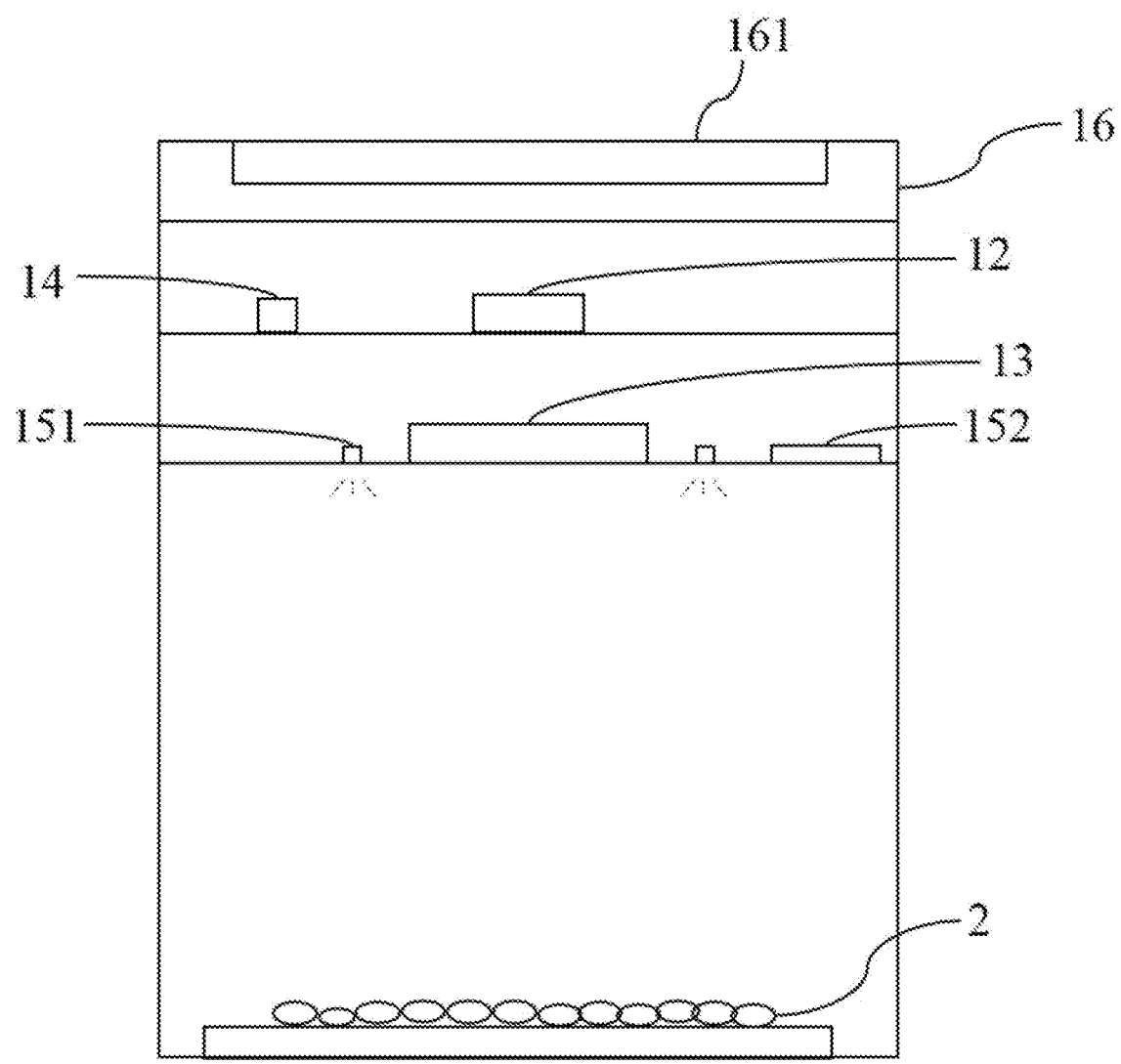
FIG. 2 is a systematic structure schematically showing the coffee bean roasting-degree distribution measuring device in FIG. 1.

FIG. 1 is a three-dimensional perspective view schematically showing a coffee bean roasting-degree distribution measuring device according to an embodiment of this invention. FIG. 2 is a systematic structure schematically showing the coffee bean roasting-degree distribution measuring device in FIG. 1. Referring to FIG. 1 and FIG. 2, in one embodiment, the coffee bean roasting-degree distribution measuring device 1 contains a housing 11, a micro-processing unit 12, an image-capturing unit 13, a memory unit 14, a light-emitting unit 15 and a display unit 16. The housing 11 contains a first end 111 and a second end 112 with the first end 111 and the second end 112 being opposite and an accommodating space 113 being disposed between the first end 111 and the second end 112. The first end 111 can be a closed end which is not opened to the outside. The second end 112 is formed with an opening 1121 connecting the outside and allowing the roasting-degree distribution measuring device 1 to surround a group of coffee beans 2 under measurement through the opening 1121 while in operation. The micro-processing unit 12, the image-capturing unit 13 and the memory unit 14 are all disposed inside the accommodating space 113. The image-capturing unit 13 and the micro-processing unit 12 are electrically connected with each other, the memory unit 14 is electrically connected to the micro-processing unit 12 and the image-capturing unit 13. The light emitting unit 15 is disposed inside the accommodating space 113 and has one or more than one light emitter 151 and a circuit board 152. The circuit board 152 and the light emitters 151 are electrically connected, and the circuit board 152 is also connected with the micro-processing unit 12. Each light emitter 151 contains one light source capable of emitting a specific wavelength, such as LED light source, and has a light emitting port 1511 facing toward the second end 112. As shown in FIG. 1, in one embodiment, at least four light emitters 151 are disposed along the surroundings of the image-capturing unit 13. The displaying unit 16 contains a screen 161 and is disposed on one surface of the first end 111 and electrically connected with the micro-processing unit 12. As shown in FIG. 1, in one embodiment, the coffee bean roasting-degree distribution measuring device 1 also contains a power supply unit 17 disposed inside the accommodating space 113 and electrically connected to the micro-processing unit 12, the image-capturing unit 13, the light-emitting unit 15 and the displaying unit 16 to provide electricity respectively required in operation for the micro-processing unit 12, the image-capturing unit 13, the light-emitting unit 15 and the displaying unit 16. The power supply unit 17 can provide direct-current or alternate current power and can be batteries when used to provide direct-current power.

Figure 3A:
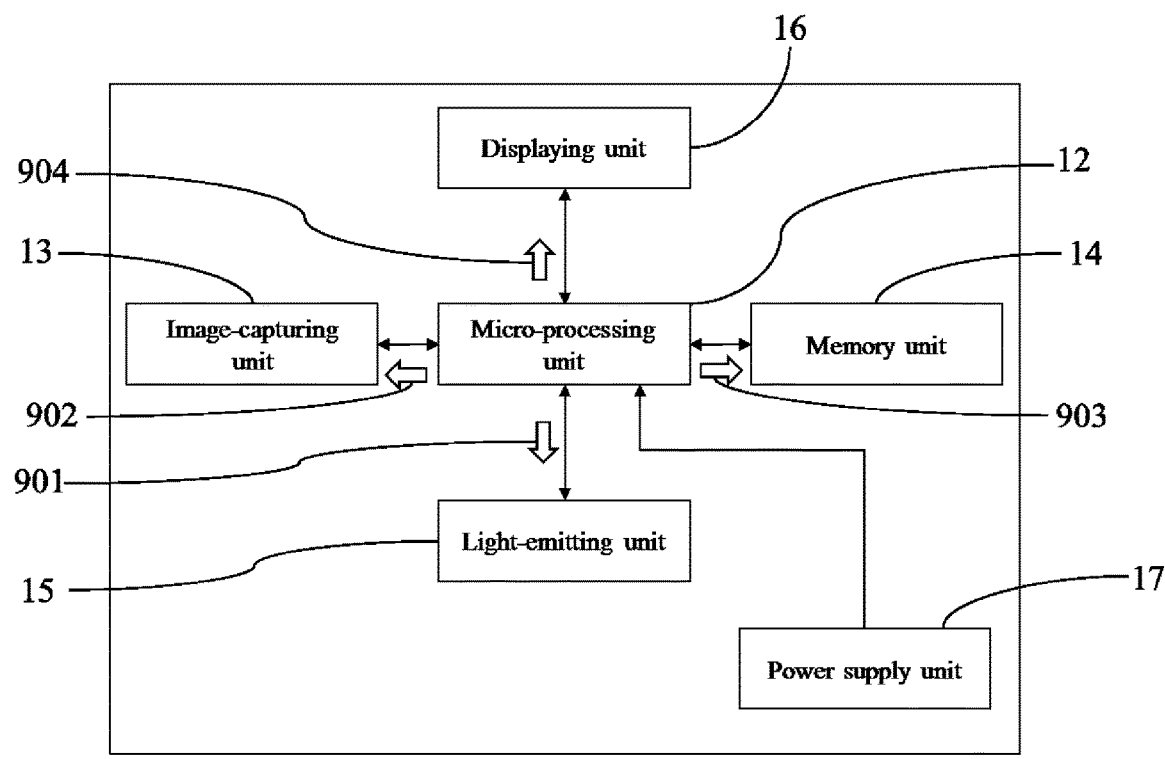
FIG. 3A is a function block diagram of the coffee bean roasting-degree distribution measuring device in FIG. 1
Figure 3B:
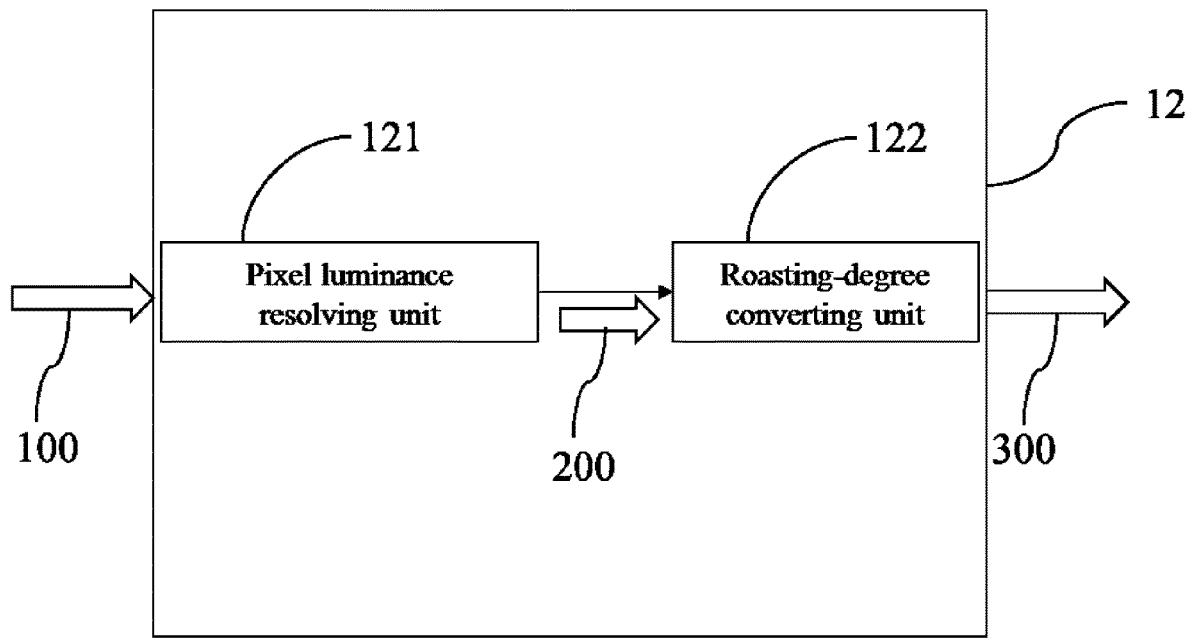
FIG. 3B is a function block diagram of the micro-processing unit of the coffee bean roasting-degree distribution measuring device in FIG. 3A.

FIG. 3A is a function block diagram of the coffee bean roasting-degree distribution measuring device in FIG. 1. FIG. 3B is a function block diagram of the micro-processing unit of the coffee bean roasting-degree distribution measuring device in FIG. 3A. As shown in FIG. 3A, the micro-processing unit 12 sends instruct signals to the image-capturing unit 13, the memory unit 14, the light emitting unit 15 and the displaying unit 16 respectively, which means the micro-processing unit 12 may collectively or individually instruct the displaying unit 13, the memory unit 14, the light emitting unit 15 and the displaying unit 16 to process corresponding tasks. In one embodiment, when the micro-processing unit 12 sends a first instruct signal 901 to the light emitting unit 15, the light emitter 151 projects light onto a group of coffee beans 2 located near the second end 112 under measurement. When the micro-processing unit 12 sends a second instruct signal 902 to the image-capturing unit 13, an image of the illuminated surface of the coffee beans 2 under measurement will be captured by the image-capturing unit 13, and an optical signal value 100, such as light intensity, of all the pixels of the captured image will be stored separately inside the memory unit 14. When the micro-processing unit 12 sends a third instruct signal 903 to the memory unit 14, the optical signal value 100 of each pixel of the captured image of the light-projected surface stored inside the memory unit 14 may be converted separately into a roasting-degree 300 by the micro-processing unit 12 and the roasting-degree 300 may also be stored inside the memory unit 14. When the micro-processing unit 12 sends a fourth instruct signal 904 to the displaying unit 16, the displaying unit 16 may present a roasting-degree distribution curve reflecting all of the roasting-degrees 300 stored inside the memory unit 14 on the screen 161.

Referring to FIG. 1 and FIG. 3A, in one embodiment, the coffee bean roasting-degree distribution measuring device 1 may further contain a measure start button 18 disposed on the housing 11 and electrically connected to the micro-processing unit 12. Only when a user presses the measure start button 18, the micro-processing 12 will be triggered to collectively or individually send the first instruct signal 901, the second instruct signal 902, the third instruct signal 903 and/or the fourth instruct signal 904. In one embodiment, the coffee bean roasting-degree distribution measuring device 1 may also contain a power switch 19 disposed on the housing 11 and electrically connected with the micro-processing unit 12. Only when the power switch 19 is switched to the on mode, the electrical connection between the power supply unit 17, the micro-processing unit 12, the image-capturing unit 13, the light emitting unit 15 and the displaying unit 16 will be conducted.

FIG. 3B is a function block diagram of the micro-processing unit of the coffee bean roasting-degree distribution measuring device in FIG. 3A. As shown in FIG. 3B, in one embodiment, the micro-processing unit 12 of the coffee bean roasting-degree distribution measuring device 1 may contain a pixel luminance resolving unit 121 and a roasting-degree converting unit 122. The pixel luminance resolving unit 121 and the roasting-degree converting unit 122 are electrically connected to each other. The pixel luminance resolving unit 121 works to convert the optical signal value 100 of each pixel of the captured image of the light-projected surface stored inside the memory unit 14 into an electrical signal value, such as a voltage or a current, and the pixel luminance resolving unit 121 may be implemented as a converter that converts an optical signal to an electrical signal. The roasting-degree converting unit 122 works to apply a calculation procedure, such as an algorithm, to the converted electrical signal values 200 and convert the converted electrical signal values 200 into the roasting-degree 300.

Figure 4:
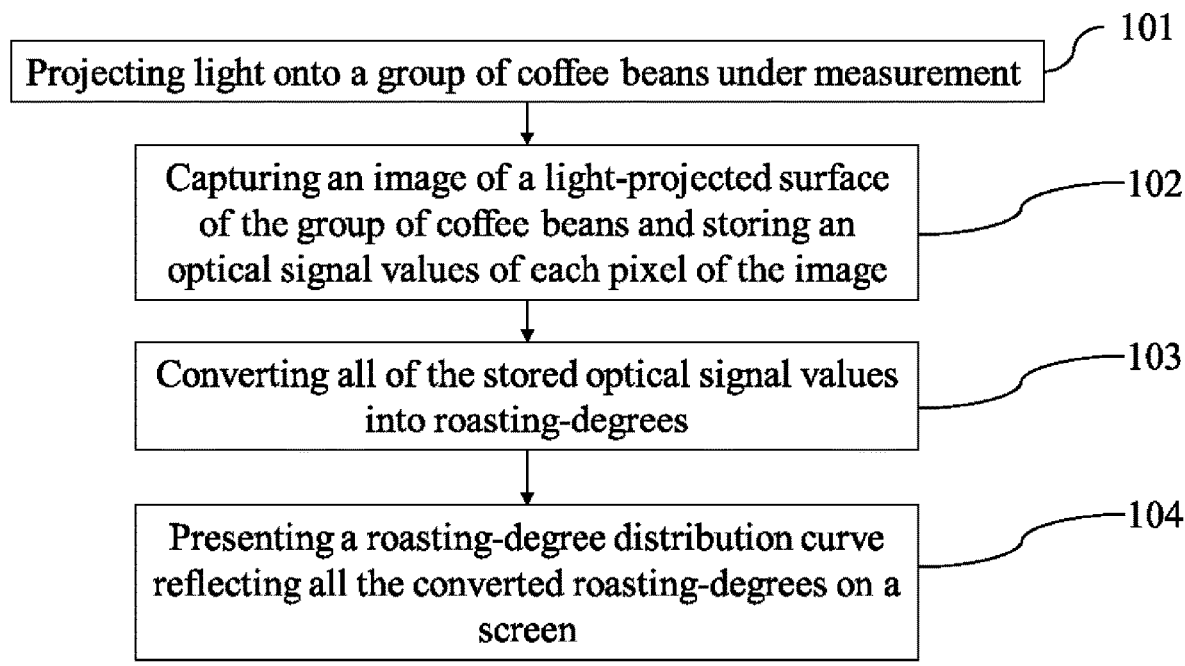
FIG. 4 is a flow chart of a coffee bean roasting-degree distribution measuring method according to an embodiment of this invention.

FIG. 4 is a flow chart of a coffee bean roasting-degree distribution measuring method according to an embodiment of this invention. As shown in FIG. 4, in one embodiment, a coffee bean roasting-degree distribution measuring method implemented on the coffee bean roasting-degree distribution measuring device as disclosed in FIG. 1 has the following steps:

Step 101: Projecting light onto a group of coffee beans under measurement. For example, the light emitter 151 as shown in FIG. 1 may be used to project a light onto a group of coffee beans 2 under measurement, where the light emitter 151 may contain LED light sources.

Step 102: Capturing an image of the light-projected surface of the group of coffee beans under measurement and storing optical signal values of all the pixels of the captured image. For example, the image-capturing unit 13 as disclosed in FIG. 1 may be used to capture the image of the light-projected surface of the group of coffee beans under measurement, and the memory unit 14 as disclosed in FIG. 1 may be used to separately store the optical signal values of all the pixels of the captured image.

Step 103: Converting the stored optical signal values of all the pixels of the captured image of the light-projected surface into corresponding roasting-degrees. For example, the pixel luminance resolving unit 121 of the micro-processing unit 12 as disclosed in FIG. 3B may be used to convert the optical signal values 100 into electrical signal values 200. After that, the roasting-degree converting unit 122 of the micro-processing unit 12 as disclosed in FIG. 3B may be used to implement a calculation procedure and convert the converted electrical signal values 200 into roasting-degrees 300.

Step 104: Presenting a roasting-degree distribution curve reflecting all the roasting-degrees on a screen. For example, the micro-processing unit 12 as disclosed in FIG. 1 may be used to instruct the displaying unit 16 as disclosed in FIG. 1 to present the roasting-degree distribution curve reflecting all the roasting-degrees on the screen 161 of the displaying unit 16.

Figure 5:
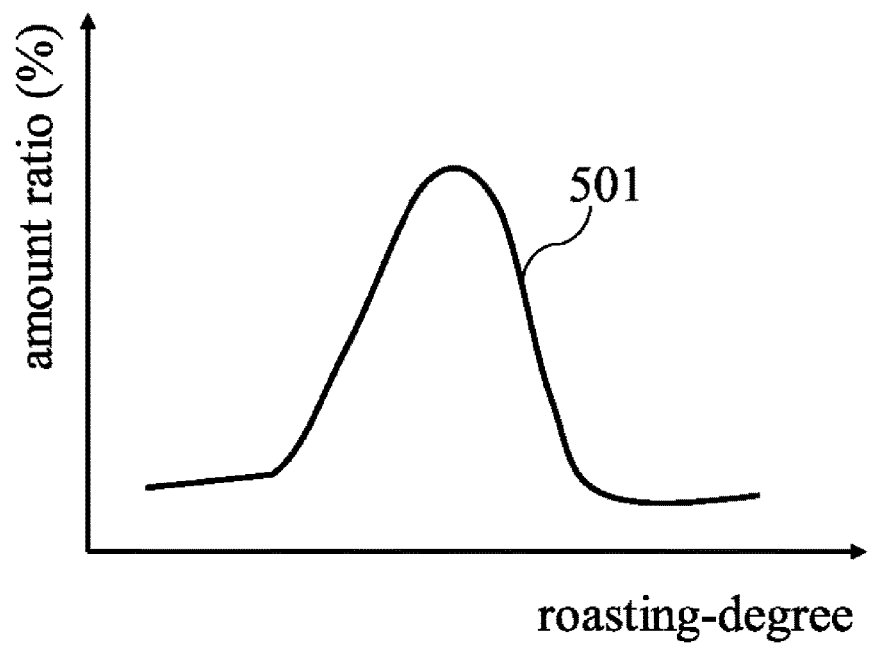
FIG. 5 is a schematic diagram of the two-dimensional roasting-degree distribution curve measured by the coffee bean roasting-degree distribution measuring device according to an embodiment in this invention.

FIG. 5 is a schematic diagram of the two-dimensional roasting-degree distribution curve measured by the coffee bean roasting-degree distribution measuring device according to an embodiment in this invention. As shown in FIG. 5, in one embodiment, a measured two-dimensional roasting-degree distribution curve 501 is defined by the roasting-degrees in an axis, such as the transverse axis, and the coffee bean amounts or the coffee bean amounts ratios corresponding to each roasting-degree in the other axis, such as the longitudinal axis. According to international convention, the roasting-degrees may range from 5 to 100. From the two-dimensional roasting-degree distribution curve, one can easily obtain the roasting-degree variance of a group of coffee beans under measurement and therefore clearly distinguish the color depth of the roasted coffee beans.

Figure 6:
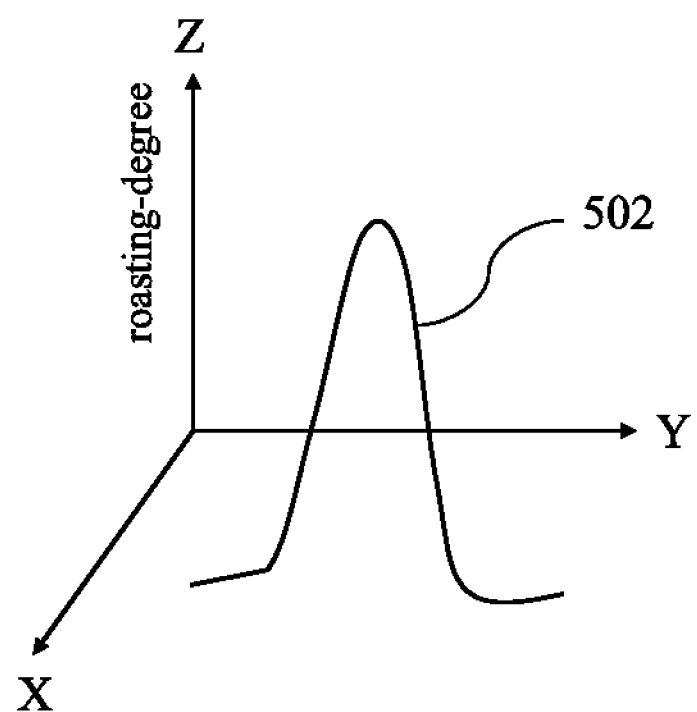
FIG. 6 is a schematic diagram of the three-dimensional roasting-degree distribution curve measured by the coffee bean roasting-degree distribution measuring device according to an embodiment in this invention.

FIG. 6 is a schematic diagram of the three-dimensional roasting-degree distribution curve measured by the coffee bean roasting-degree distribution measuring device according to an embodiment in this invention. As shown in FIG. 6, in another embodiment, a measured three-dimensional roasting-degree distribution curve 502 is defined by an X coordinate axis, a Y coordinate axis and a Z coordinated axis, where the X coordinate axis is used to represent one horizontal component of a position of each coffee bean, the Y coordinate axis is used to represent the other one horizontal component of the position of each coffee bean, while the Z coordinate axis is used to represent the roasting-degree corresponding to the position of each coffee bean. In other words, the roasting-degree distribution curve 502 reflects the coffee bean roasting-degrees corresponding to each pixel position. From this distribution curve, one can easily obtain the roasting-degree variance of more than one group of coffee beans put at different locations under measurement, and furthermore determine the roasting-degree of each group of coffee beans put at different locations. For example, when two groups of coffee beans are put in different locations, the measured roasting-degree variance corresponding to different locations can be used to compare out which group of coffee beans was deeply roasted.

In conclusion, based on the coffee bean roasting-degree distribution measuring device and method disclosed in this application, not only a single roasting-degree of a group of coffee beans or grounded coffee powders can be measured, but also the roasting-degree variance or the roasting-degree distribution between each coffee bean in the group of coffee beans or between each coffee particle in the grounded coffee powders can be measured, furthermore, the roasting uniformity of the group of coffee beans or the grounded coffee powders can be obtained by comparing the measured roasting-degrees of the group of coffee beans or the grounded coffee powders with a roasting-degree reference and finding out an amount of the coffee beans or the coffee particles with higher or lower roasting-degrees or calculating out the roasting-degree dispersion of the coffee beans or the grounded coffee powders, and displaying the roasting uniformity on the screen 161 of the displaying unit 16. In this case, a user can precisely and directly know the roasting depth difference. For example, measurement of a standard deviation or a coefficient of variation of the roasting-degrees of a group of coffee beans may be a base to know the roasting depth of that group of coffee beans, and the measured standard deviation or the measured coefficient of variation may be displayed on the screen 161 of the display unit 16.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangement.

What is claimed is:

1. A coffee bean roasting-degree distribution measuring device used to measure a group of roasted coffee beans under measurement, comprising:
   a housing having a first end, a second end opposite the first end, and an accommodating space disposed between the first end and the second end, the second end being formed with an opening, wherein the housing is entirely disposed on top of the group of roasted coffee beans under measurement with the opening surrounding the group of roasted coffee beans under measurement when the measuring device is in operation;
   a micro-processing unit disposed inside the accommodating space;
   an image-capturing unit disposed inside the accommodating space and electrically connected to the micro-processing unit;
   a memory unit disposed inside the accommodating space and electrically connected to the micro-processing unit and the image-capturing unit;
   a light emitting unit being disposed inside the accommodating space and having at least one light emitter and a circuit board electrically connected to the light emitter, the circuit board being electrically connected to the micro-processing unit, the light emitter having a light emitting port facing toward the second end; and
   a displaying unit having a screen and being disposed on the first end and electrically connected to the micro-processing unit;
   wherein the light emitter of the light emitting unit projects light onto the group of roasted coffee beans under measurement to illuminate the group of roasted coffee beans under measurement when the micro-processing unit sends a first instruct signal to the light emitting unit; the image-capturing unit captures an image of a light-projected surface of all of the roasted coffee beans under measurement and the memory unit stores an optical signal value of each pixel of the captured image when the micro-processing unit sends a second instruct signal to the image-capturing unit; the optical signal value of each pixel of the captured image is converted by the micro-processing unit into an electrical signal and the electrical signal is further converted by the micro-processing unit into a roasting-degree when the micro-processing unit sends a third instruct signal to the memory unit; and the displaying unit presents roasting uniformity of the group of orasted coffee beans under measurement on the screen when the micro-processing unit sends a fourth instruct signal to the displaying unit.

2. The coffee bean roasting-degree distribution measuring device of claim 1, wherein the the displaying unit further presents a roasting-degree distribution curve which is defined in an axis by the roasting-degrees and in another axis by a coffee bean amount ratio corresponding to the roasting-degrees.

3. The coffee bean roasting-degree distribution measuring device of claim 1, wherein the displaying unit further presents a roasting-degree distribution curve reflecting the roasting-degrees corresponding to each pixel position of the group of roasted coffee beans under measurement.

4. The coffee bean roasting-degree distribution measuring device of claim 1, wherein the displaying unit further presents one of a standard deviation and a coefficient of variation of the roasting-degrees of the group of roasted coffee beans under measurement.

5. The coffee bean roasting-degree distribution measuring device of claim 1, further comprising a measure start button disposed on the housing and electrically connected to the micro-processing unit, wherein only a press of the measure start button triggers the micro-processing to send one of the first instruct signal, the second instruct signal, the third signal, and the fourth signal.

6. The coffee bean roasting-degree distribution measuring device of claim 1, further comprising a power supply unit disposed inside the accommodating unit and electrically connected to the micro-processing unit to provide the micro-processing unit with an electrical power.

* * * * *